United States Patent
Bartoli et al.

(10) Patent No.: US 10,279,986 B2
(45) Date of Patent: May 7, 2019

(54) CAPSULE FOR BEVERAGES

(71) Applicant: SARONG SOCIETA' PER AZIONI, Reggiolo (Reggio Emilia) (IT)

(72) Inventors: Andrea Bartoli, Reggio Emilia (IT); Davide Capitini, Reggio Emilia (IT); Alessandro Grillenzoni, Campogalliano (IT); Flavio Traldi, San Prospero (IT)

(73) Assignee: SARONG SOCIETA' PER AZIONI, Reggiolo (Reggio) (IT)

( * ) Notice: Subject to any disclaimer, the term of this patent is extended or adjusted under 35 U.S.C. 154(b) by 254 days.

(21) Appl. No.: 15/122,848

(22) PCT Filed: Mar. 10, 2015

(86) PCT No.: PCT/IB2015/051726
§ 371 (c)(1),
(2) Date: Aug. 31, 2016

(87) PCT Pub. No.: WO2015/136433
PCT Pub. Date: Sep. 17, 2015

(65) Prior Publication Data
US 2017/0073153 A1    Mar. 16, 2017

(30) Foreign Application Priority Data

Mar. 12, 2014  (IT) .............................. M02014A0062

(51) Int. Cl.
*B65D 85/804* (2006.01)
*B65D 1/42* (2006.01)

(52) U.S. Cl.
CPC ........... *B65D 85/8043* (2013.01); *B65D 1/42* (2013.01)

(58) Field of Classification Search
CPC .............................. B65D 85/8043; B65D 1/42
See application file for complete search history.

(56) References Cited

U.S. PATENT DOCUMENTS

2007/0144355 A1* 6/2007 Denisart ............. A47J 31/3695
99/275
2014/0290494 A1* 10/2014 Chia .................. B65D 85/8043
99/295

FOREIGN PATENT DOCUMENTS

CN    101014513 A    8/2007
CN    102741136 A    10/2012
(Continued)

OTHER PUBLICATIONS

International Search Report & Written Opinion of the International Searching Authority Application No. PCT/IB2015/051726 Completed: May 28, 2015; dated Jun. 5, 2015 12 pages.
(Continued)

*Primary Examiner* — Viren A Thakur
*Assistant Examiner* — Chaim A Smith
(74) *Attorney, Agent, or Firm* — Whitmyer IP Group LLC

(57) ABSTRACT

A capsule for beverages includes a casing made by forming a sheet of thermoformable plastic material, the casing including: a base wall and a side wall defining a cavity suitable for containing an initial product to be combined with a fluid to obtain a final product in the form of a beverage, a first opening of the cavity opposite the base wall, an edge extending from the side wall and surrounding the first opening and a second opening made in the base wall. The first opening is closed hermetically by a cover element fixed to the edge, said the cover element being perforable by an injection arrangement of a dispensing machine in which the capsule is usable. The second opening is closed hermetically by a closing element) suitable for tearing when pressure inside the cavity exceeds a predetermined value. The capsule further includes a chamber placed opposite the base wall with respect to the cavity, the chamber being able to communicate with the cavity through the second opening, when the closing element tears, the chamber being provided with an outlet opening, made in the center of a bottom wall opposite the base wall. Inside the chamber a damping element is arranged that can communicate with the cavity through the second opening, when the closing element tears, (Continued)

the damping element being sized in such a manner as to prevent the occurrence of the water hammer phenomenon at the moment of tearing of the closing element, or at least to reduce considerably the intensity of the pressure waves generated by the phenomenon, the damping element acting also as a resting element for the closing element when the latter is deformed through the effect of a pressure increase inside the cavity.

9 Claims, 4 Drawing Sheets

(56) References Cited

FOREIGN PATENT DOCUMENTS

| CN | 103025626 A | 4/2013 |
|---|---|---|
| EP | 2444339 A1 | 4/2012 |
| WO | 03059778 A2 | 7/2003 |
| WO | 2005020769 A1 | 3/2005 |
| WO | 2006021405 A2 | 3/2006 |
| WO | 2007141202 A1 | 12/2007 |
| WO | 2009006374 A2 | 1/2009 |
| WO | WO 2009/006374 * | 1/2009 |
| WO | 2012055751 A2 | 5/2012 |
| WO | WO 2013/124811 * | 8/2013 |
| WO | 2013167437 A1 | 11/2013 |

OTHER PUBLICATIONS

Chinese Office Action (with translation) Application No. 201580010621.0 dated Sep. 18, 2017 8 pages.

* cited by examiner

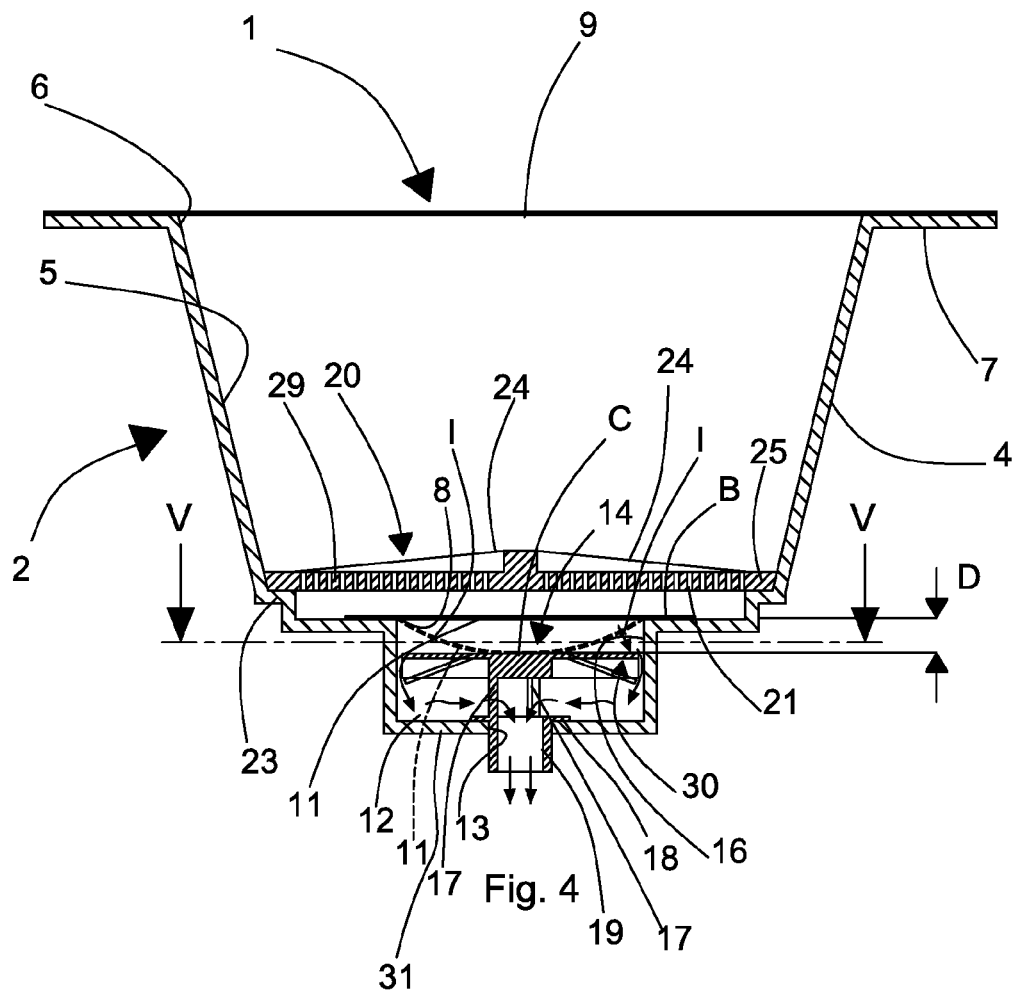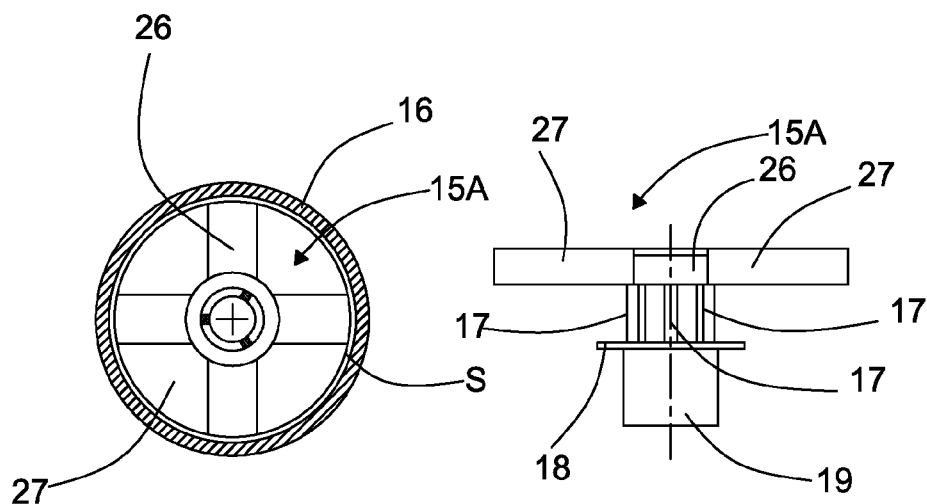

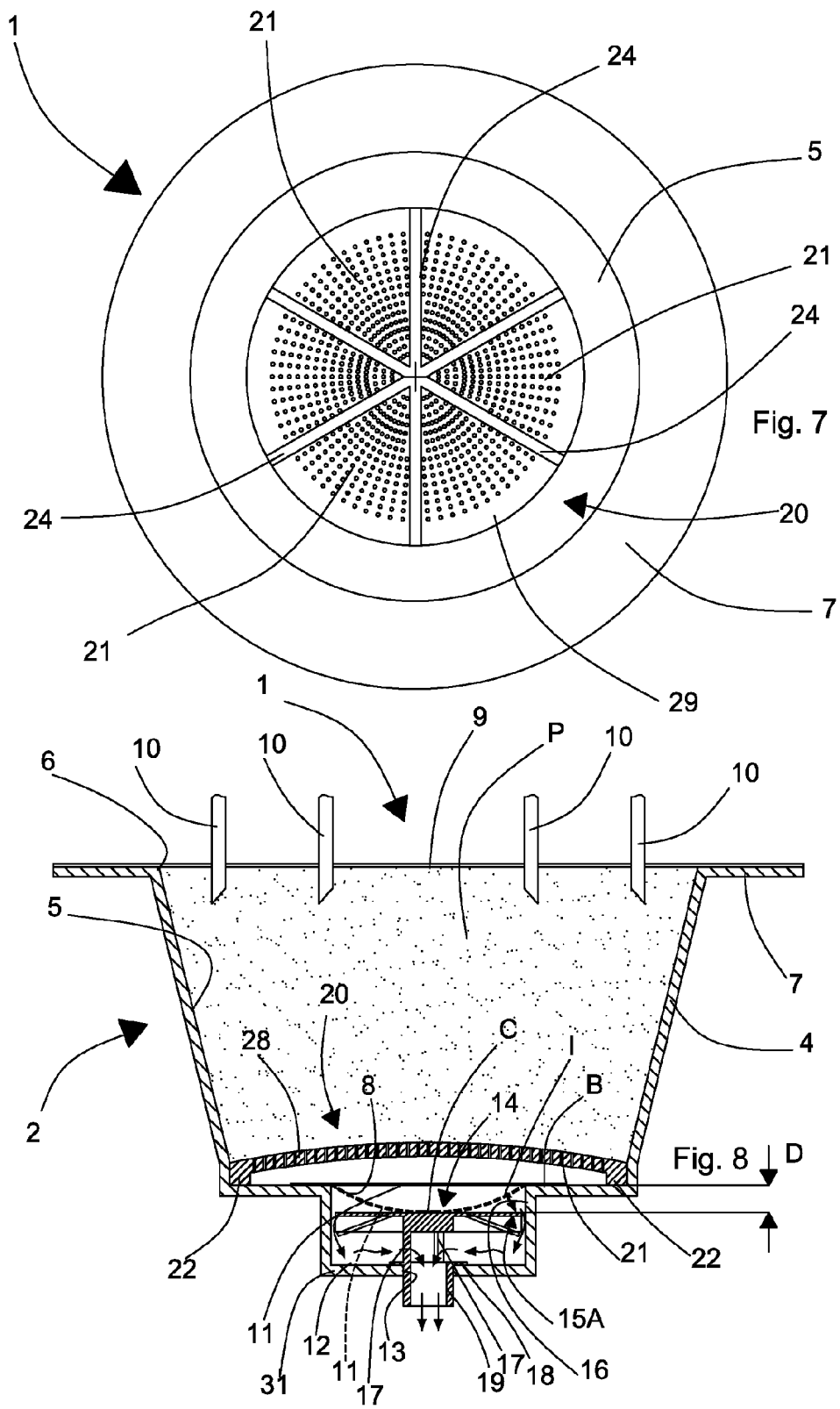

CAPSULE FOR BEVERAGES

CROSS-REFERENCE TO RELATED APPLICATIONS

This application is a national phase of PCT International Application No. PCT/IB2015/051726 filed Mar. 10, 2015. PCT/IB2015/051726 claims priority to IT Application No. MO2014A000062 filed Mar. 12, 2014. The entire contents of these applications are incorporated herein by reference.

TECHNICAL FIELD

The invention relates to capsules or containers for preparing products, for example beverages, in automatic dispensing machines. In particular, the invention relates to a sealed, single-dose and disposable capsule containing an initial product that is able to make a final product by interacting with pressurised fluid.

BACKGROUND

Capsules are known that are intended for use on dispensing machines, which consist of single-dose and disposable containers comprising an outer casing, made of plastic material that are impermeable to liquids and to gases and have the shape of a beaker or cup. The casing has a bottom wall and a side wall defining an upper opening through which the product can be inserted from which to obtain the beverage. The upper opening is closed hermetically by a cover element, typically a sheet of aluminium or a plastic film, so as to seal the product inside the container. The cover element is generally fixed to a flange-shaped peripheral and annular edge of the casing, which is opposite the bottom wall and arranged around the upper opening.

In the bottom wall a lower opening is obtained through which the beverage is dispensed. The lower opening is closed hermetically by a closing element, typically a sheet of aluminium or a plastic film as the cover element of the upper opening.

SUMMARY

The capsule is perforable to permit pressurised liquid, in particular water, to be delivered inside the capsule. In particular, the cover element is perforable by a suitable arrangement of a dispensing machine to enable the pressurised liquid to be delivered into the capsule.

The beverage is dispensed by the breaking of the closing element, which occurs when the pressure inside the capsule exceeds a predetermined value, depending on the mechanical resistance of the closing element.

One problem that occurs with this type of capsule arises from the fact that the breaking of the closing element causes a sudden pressure variation inside the capsule, which can trigger the so-called "water hammer" phenomenon, that can lead to the explosion of the capsule and also to damage of the hydraulic circuit of the dispensing machine, because the pressure waves generated by the hammer can spread in the nozzles that deliver the pressurised liquid into the capsule and from the nozzles to the entire hydraulic circuit of the dispensing machine.

A further problem that occurs with this type of capsule is due to the fact that, when the closing element breaks, the pressurised liquid exits the capsule at high speed and, reaching a container intended for receiving the beverage, can cause squirts that exit the container, dirtying the dispensing machine and the zone surrounding the container.

In order to solve the aforesaid problems, capsules have been designed that are provided, downstream of the lower opening, with one or more labyrinth paths, the object of which is to decrease the speed at which the beverage exits the capsule, to prevent the formation of spurts when the beverage reaches the container intended to receive the beverage, and generate load losses that make the pressure drop inside the capsule less sudden, i.e. more progressive, at the moment of breaking of the closing element of the lower opening.

Making these labyrinth paths is nevertheless complex and increases considerably the cost of manufacturing the capsule, in addition to not guaranteeing fully that no water hammer occurs when the closing element is broken.

An object of the present invention is to make a capsule that is usable in known dispensing machines that prevents the occurrence of the water hammer phenomenon when the closing element of the lower opening of the capsule breaks and prevents the formation of spurts whilst the beverage is dispensed.

A further object is to obtain a capsule that is cheap and easy to make.

According to the invention a capsule is provided for beverages according to claim 1 and one or more of the claims appended thereto.

BRIEF DESCRIPTION OF THE DRAWINGS

The invention can be better understood and implemented with reference to the attached drawings that illustrate some embodiments thereof by way of non-limiting example, in which:

FIG. 1 is a schematic cross section of a first embodiment of a capsule according to the invention;

FIG. 4 is a schematic cross section of a second embodiment of a capsule according to the invention;

FIG. 5 is section v-v of FIG. 4;

FIG. 6 is an enlarged detail of the capsule of FIG. 4;

FIG. 7 is a top view of the capsule of FIG. 4, without the cover element;

FIG. 8 is a schematic cross section of a third embodiment of a capsule according to the invention;

DETAILED DESCRIPTION

Figure 2:
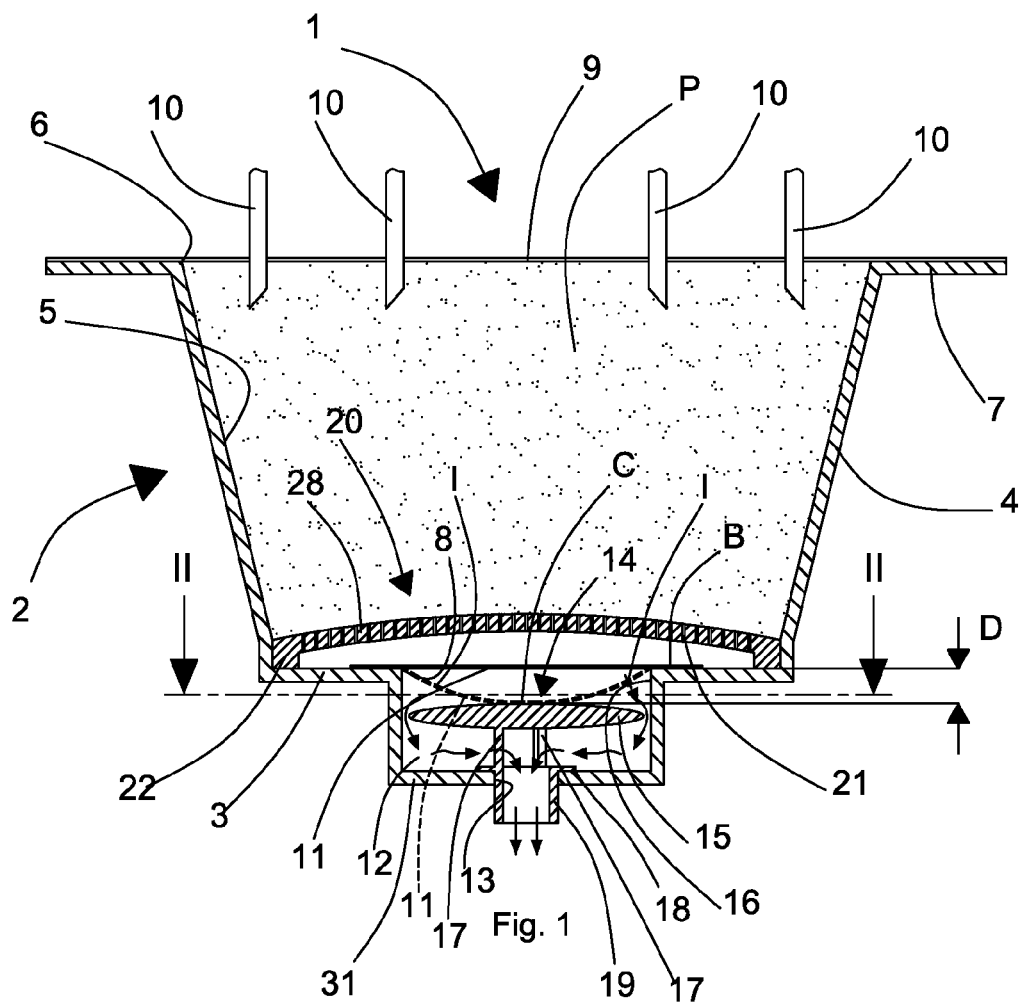
FIG. 2 is section II-II of FIG. 1.

In FIG. 1 a first embodiment is illustrated of a capsule 1 for beverages according to the invention, which is usable in an automatic dispensing machine for producing a final product, in particular a hot beverage, for example coffee, barley, herbal tea, tea, chocolate, etc., by injecting a hot pressurised fluid, for example water, inside the capsule.

The capsule 1 according to the invention comprises an outer casing or container 2, in turn comprising a base wall 3 and a side wall 4 defining a cavity 5 that is open and suitable for containing an initial product P, for example a food, soluble or percolatable product to be combined with a fluid, typically water, to obtain a final product in the form of a beverage. The base wall 3 and the side wall 4 define a body of the capsule 1 that is substantially beaker or cup shaped.

The casing further comprises a flange-shaped edge 7 connected to the side wall 4 and extending therefrom, arranged around a first opening 6 of the cavity 5, opposite the base wall. The edge 7 is also opposite the base wall 3 and faces outside the cavity 5.

The base wall 3 is arranged around a second opening 8, through which the beverage, prepared from the initial product P, can exit the cavity 5. The base wall 3 is obtained as an annular plane surrounding the second opening 8 during forming of the casing 2.

The casing 2 is in fact made by forming a sheet of thermoformable plastic material that is suitable for the process of preparing the final product from the initial product P, for example it is able to withstand without deformation temperatures up to 100° C. and pressures at least up to 5 bar.

Such a sheet of plastic material can have a thickness comprised between 15 micron and 1400 micron, in particular between 350 micron and 1200 micron and is made of a polyolefin, for example polypropylene PP and/or polyethylene PE and/or polyamide PA.

In detail, the sheet material can comprise a first layer of material, in particular suitable for contacting and/or conserving the initial product P, for example made of polypropylene PP that is impermeable to humidity, a second layer of material that is not in contact with the initial product P made of material that is impermeable to gases, in particular to oxygen and optionally also to humidity, also known as a barrier layer and third layer of outer material.

The barrier layer, interposed between the first and the second layer, ensures complete insulation of the external environment of the cavity 5, in particular if the first layer is permeable over time to oxygen. The barrier layer has a thickness comprised between 2 micron and 100 micron, in particular between 15 micron and 70 micron, and is made for example of ethylene vinyl alcohol (EVOH), which is gas-impermeable only to oxygen or polyvinylidene chloride (PVDC), which is impermeable to gases, both to oxygen and to humidity.

According to a first embodiment (not shown) of the sheet material, the first and the third layer are made of the same material, for example polypropylene PP, and are coupled with the barrier layer interposed therebetween. Such layers can have the same thickness (for example 350 micron), or different thicknesses (for example the first layer can have a thickness of 500 micron whereas the third layer can have a thickness of 300 micron).

According to a second alternative embodiment (not shown), the first layer is a support layer and is made of polypropylene PP, the second layer is the barrier layer (EVOH or PVDC) and the third layer is an extruded layer of polypropylene PP or polyethylene PE, with a thickness equal to 15 micron, which is coupled with the first and second layer during the process of producing the sheet material.

The sheet material, both in accordance with the first and the second embodiment, is thus selected in such a manner as to protect over time the initial product P contained in the capsule from humidity and oxygen.

The capsule further comprises a cover element 9 fixed to the edge 7 of the casing 2 to close hermetically the first opening 6 of the open cavity 5. The cover element 9 comprises a sheet of aluminium or a plastic film provided with a barrier layer that is perforable by an injection arrangement 10 by means of which a pressurised liquid, for example water, is injected inside the cavity 5 to produce the beverage.

The cover element 9 is fixed to the edge 7 of the casing 2 by thermal or ultrasound welding or gluing. In particular, the cover element 9 is fixed to the casing by thermowelding.

The second opening 8, in particular of circular shape, in the base wall 3 is also closed hermetically by a closing element 11 that is similar to the cover element 9, fixed to the base wall 3, inside the cavity 5, by thermal or ultrasound welding, or gluing. Also the closing element 11 is fixed to the casing 2, in particular by thermowelding.

The cover element 9 and the closing element 11 are used to close hermetically the cavity 5 and preserve the initial product P contained therein.

The closing element 11 is intended to tear when, following the delivery of pressurised liquid into the cavity 5, the pressure inside the cavity 5 exceeds a predetermined value, depending on the mechanical resistance of the material of which the closing element 11 is made. Tearing the closing element 11 causes the beverage to exit the cavity 5 and subsequent dispensing thereof into a container intended for receiving the beverage, for example a cup or a beaker.

In the lower part of the cavity 5 a filtering element 20 is arranged comprising a body 28, for example made of plastic material, in which a plurality of holes 21 is obtained, the holes having dimensions that are such as to permit the passing of the beverage but to prevent the passing of the initial product P, when the initial product P is made of non-soluble material. This is to prevent particles of the product P being able to be dispensed together with the beverage.

The body 28 is provided with an annular ridge 22, by means of which the filtering element 20 rests on the base wall 3.

The filtering element 20 is made in such a manner as to provide great resistance to deformation so as not to be deformed significantly through the effect of the pressure that develops within the cavity 5 when a pressurised liquid is delivered thereto to prepare the beverage.

Figure 3:
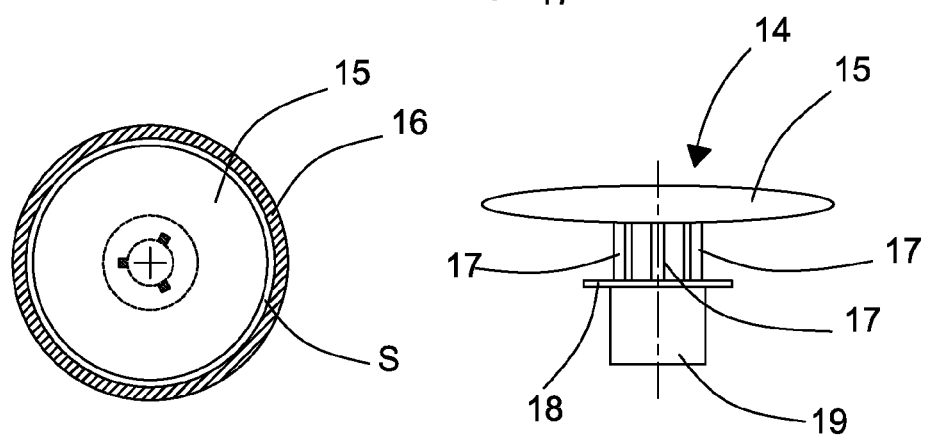
FIG. 3 is an enlarged detail of the capsule of FIG. 1.

In the embodiment of the capsule 1 according to the invention illustrated in FIGS. 1 to 3, the body 28 of the filtering element 20 has a convex shape, with convexity facing inside the cavity 5.

The casing 2 further comprises a bottom wall 31 so that the capsule 1 comprises a chamber 12 located opposite the base wall 3 with respect to the cavity 5. The chamber 12 can communicate with the cavity 5 through the second opening 8, when the closing element 11 is torn. The chamber 12 has a cross section for example of circular shape and is provided with an outlet opening 13, made in the centre of the bottom wall 31 of the casing 2, opposite the base wall 3 of the casing 2, through which the beverage is dispensed that is prepared by means of the initial product P. The chamber 12 can also have a different section from the circular section, for example an elliptical or polygonal section.

Inside the chamber 12 a damping element 14 is arranged, the function of which is to control the exit speed of the beverage, in particular to prevent the occurrence of the phenomenon of water hammer at the moment of tearing of the closing element 11, or, at least, considerably reduce the intensity of the pressure waves generated by the aforesaid phenomenon. The damping element 14 also performs the function of preventing the formation of spurts whilst the beverage is dispensed into a container.

The damping element 14 comprises a body 15 having a plan shape corresponding to the shape of the cross section of the chamber 12 and cross section of rectangular or also substantially lenticular shape. The body 15 has dimensions that are such that between the body 15 and the side wall 16 of the chamber 12 an annular passage S of reduced width remains that is such as to significantly slow down the speed of the beverage that passes through the annular passage and generate a significant pressure difference between the entrance and the exit of the passage S. In particular, the width of the annular passage S is not greater than 2 mm, which also enables a beverage with foam to be obtained.

The body 1 of the damping element 14 also acts as a resting element for the closing element 11 when the latter is deformed through the effect of a pressure increase due to the delivery of liquid into the cavity 5. The distance D between the body 15 and the closing element 11 is chosen in such a manner that the central zone of the closing element 11 comes to rest on the body 15 before getting torn through the effect of the pressure increase in the cavity 5.

The body 15 of the damping element 14 is fixed by a plurality of columns 17 to a flange 18 of a hollow cylindrical element 19 having dimensions that are such as to be inserted with interference into the outlet opening 13, so as to act as a nozzle for dispensing the beverage and maintaining the body 15 of the damping element 14 centred in the chamber 13, so that the annular passage S has a substantially constant width.

The body 15, the columns 17, the flange 18 and the hollow cylindrical element 19 are for example made of a single body.

When the pressure in the cavity 5 increases, the closing element 11 is deformed, progressively taking on a convex configuration with convexity facing the body 15 of the damping element 14. Through the effect of the deformation, the distance D decreases until it disappears when the central zone C of the closing element 11 comes into contact with and comes to rest on the body 15.

Through the effect of the resting of the closing element 11 on the body 15, when the pressure inside the chamber 5 reaches a value that is sufficient to provoke the tearing of the closing element 11, the latter, not being able to tear at said central zone C through the effect of resting on the body 15, tears at one or more points in an intermediate zone I comprised between the central zone C and the edge B of the closing element 11. It is pointed out that in this manner tearing occurs in a controlled manner at a pressure that depends on said distance D, which is greater the less the distance D and thus the greater the resting surface of the closing element 11 on the body 15.

In this manner the jet, or jets, of liquid that is/are generated through the tearing of the closing element 11 is/are directed to the passage S.

Through the effect of the dimensions of the annular passage S, the beverage that exits at high speed from the tearing of the closing element 11 is greatly slowed when passing through the annular passage S. This causes a great pressure drop through the passage S, which enables the pressure decrease in the cavity 5 to be reduced greatly at the moment of tearing of the closing element 11 and a progressive decrease of pressure in said cavity 5 to be obtained whilst the beverage is dispensed so as to avoid the occurrence of the water hammer phenomenon, or greatly limit the intensity of the pressure waves generated by the aforesaid phenomenon. In this manner, the risk is avoided that the capsule may explode at the moment of tearing of the closing element 11 and pressure waves may be generated that are able to damage the hydraulic circuit of the dispensing machine, spreading through the injection arrangement 10.

The slowing of the beverage through the annular passage S means that the beverage reaches the hollow cylindrical element 19 at low speed and is then dispensed into a container that is intended to receive the beverage without producing spurts that may dirty the dispensing machine and the zone surrounding said container.

The body 15 of the damping element 14 can be made to be stiff, or elastically deformable. In this latter case, through the effect of the pressure exerted thereupon by the beverage that exits the cavity 5, the edge of the damping element is deformed, thus varying the width of the annular passage S, which increases at the start of dispensing of the beverage, and then decreases progressively to a minimum value corresponding to the undeformed configuration of the body 15, whilst the pressure inside the cavity 5 decreases.

The effect of damping the water hammer and the slowing of the beverage exiting the capsule 1 are equally effective both in the case of a stiff body 15 and in the case of an elastic body 15.

In FIGS. 4 to 7 a second embodiment of a capsule 1 according to the invention is illustrated.

In this second embodiment the parts of the capsule 1 that are identical to those of the first embodiment are indicated by the same reference numbers.

This second embodiment differs from the first embodiment only in terms of the conformation of the damping element 14 and of the filtering element 20.

The damping element 14 comprises a body 30 having a plan shape corresponding to the shape of the cross section of the chamber 12 and dimensions that are such that between the body 30 and the wall 16 of the chamber 12 an annular passage S remains that is of reduced width that is such as to significantly slow down the speed of the beverage that passes through it and generate a significant pressure difference between the entrance and the exit of the passage S. In particular, the width of the annular passage S is not greater than 2 mm, which also enables a beverage with foam to be obtained.

The body 30 comprises a plurality of substantially stiff sectors 27, separated by elastically deformable flexible elements 26, for example in the form of fins, that flex through the effect of the pressure exerted thereupon by the beverage exiting the cavity 5, thus varying the width of the annular passage S in the zones corresponding to the ends of the fins 26, increasing said width at the start of dispensing of the beverage, and then decreases the width progressively to a minimum value corresponding to the undeformed configuration of the fins 26, whilst the pressure inside the cavity 5 decreases.

The body 30 of the damping element 14 is fixed, by a plurality of columns 17, to a flange 18 of a hollow cylindrical element 19 having dimensions that are such as to be inserted with interference into the outlet opening 13, so as to act as a nozzle for dispensing the beverage and maintaining the body 15 of the damping element 14 centred in the chamber 13, so that the annular passage S has a substantially constant width.

The body 30, the columns 17, the flange 18 and the hollow cylindrical element 19 are for example made of a single body.

The filtering element 20 has a substantially flat respective body 29, for example made of plastic material, in which a plurality of holes 21 is made, that have dimensions that are such as to permit the passage of the beverage but prevent the passage of the initial product P, when it consists of non-soluble material. This is to prevent particles of the product P being dispensed together with the beverage.

The body 29 is provided, on the face facing the inside of the cavity 5, with a plurality of stiffening radial ribs 24, in particular arranged with a constant angular pitch that prevent the filtering element 20 being deformed significantly through the effect of the pressure developing in the cavity 5 when a pressurised liquid is delivered thereinto for preparing the beverage. The number of radial ribs 24 is for example equal to six.

A peripheral edge 25 of the filtering element 20 rests on an annular step 23 obtained near the base wall 3.

In FIG. 8 a third embodiment of a capsule 1 according to the invention is illustrated.

In this third embodiment, the capsule 1 is provided with a damping element 14 comprising a body 30 consisting of a plurality of substantially stiff sectors 27, separated by flexible elements 26, for example in the form of fins, as in the second embodiment illustrated in FIGS. 4 to 7. Further, the capsule 1 is provided with a filtering element 20 provided with a body 28 having a convex shape, with convexity facing the inside of the cavity 5, as in the first embodiment of the capsule 1 illustrated in FIGS. 1 to 3.

Figure 9:
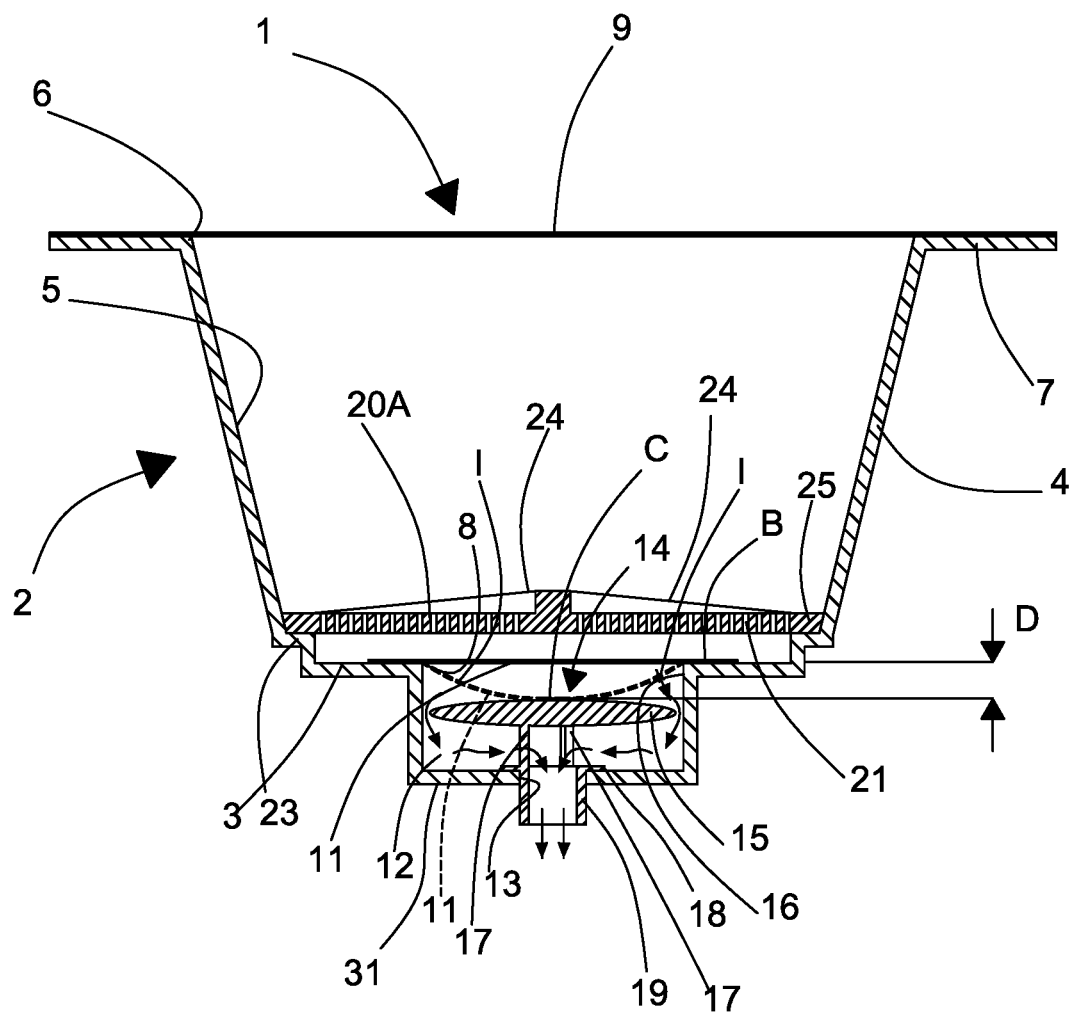
FIG. 9 is a schematic cross section of a fourth embodiment of a capsule according to the invention.

In FIG. 9, a fourth embodiment of a capsule 1 according to the invention is illustrated.

In this fourth embodiment, the capsule 1 is provided with a damping element 14 comprising a body 15 having a plan shape corresponding to the shape of the cross section of the chamber 12 and with a substantially lenticular section, as in the first embodiment of the capsule illustrated in FIGS. 1 to 3. Further, the capsule 1 is provided with a filtering element 20 provided with a substantially flat body 29 provided, on the face facing the inside of the cavity 5, with a plurality of stiffening radial ribs 24, arranged in particular at a constant angular pitch, as in the second embodiment of the capsule 1 illustrated in FIGS. 4 to 7.

Owing to the casing 2 of the capsule 1 made by thermoforming and to the damping element 14 made of a single body with the hollow cylindrical element 19 that acts as a dispensing nozzle and is fixed through interference in the outlet opening 13 a capsule 1 is obtained that is made at low cost that also enables a beverage with foam to be obtained, where required.

The invention claimed is:

1. A capsule for beverages, comprising a casing made by forming a sheet of thermoformable plastic material, said casing comprising: a base wall and a side wall defining a cavity suitable for containing an initial product to be combined with a fluid to obtain a final product in the form of a beverage, a first opening of said cavity opposite said base wall, an edge extending from said side wall and surrounding said first opening, a second opening around which said base wall is arranged, wherein said first opening is closed hermetically by a cover element fixed to said edge, said cover element being perforable by an injection arrangement of a dispensing machine in which said capsule is usable, wherein said second opening is closed hermetically by a closing element that is suitable for tearing when a pressure inside said cavity exceeds a predetermined value, wherein the capsule further comprises a chamber placed on the opposite side to the base wall with respect to the cavity, said chamber being able to communicate with the cavity through the second opening, when the closing element tears, said chamber being equipped with an exit opening, made in the center of a bottom wall of the casing opposite the base wall, a damping element being arranged inside said chamber to control the output speed of the beverage, wherein said damping element comprises a body having a plan shape corresponding to the shape of a cross section of said chamber and dimensions such that between the body and a side wall of said chamber an annular passage of reduced width remains, not exceeding 2 mm, so as to significantly slow down the speed of said beverage that passes through the annular passage and generate a significant pressure difference between an entrance and an exit of the passage.

2. The capsule according to claim 1, further comprising a filtering element arranged near the base wall.

3. The capsule according to claim 2, wherein said filtering element comprises a body in which there is formed a plurality of holes having dimensions that allow the passage of said beverage, but to prevent the passage of the initial product, when the initial product is made of non-soluble material, said body having a convex shape, with convexity facing the inside of the cavity.

4. The capsule according to claim 2, wherein said filtering element comprises a body substantially flat in which a plurality of holes are made having dimensions that enable the passage of the beverage, but to prevent the passage of the initial product, when the initial product is made of non-soluble material, said body being equipped, on a face of the body turned facing the inside of the cavity, with a plurality of stiffening radial ribs.

5. Capsule according to claim 1, wherein said body is fixed via a plurality of columns to a flange of a hollow cylindrical element having such dimensions as to be inserted with interference into said exit opening, said body, said plurality of columns, said flange and said hollow cylindrical element being a single body.

6. The capsule according to claim 1, wherein said body has a cross section of lenticular shape.

7. The capsule according to claim 6, wherein said body is made of a substantially stiff material.

8. The capsule according to claim 6, wherein said body is made of an elastically deformable material.

9. The capsule according to claim 1, wherein said body comprises a plurality of substantially stiff sectors separated by elastically deformable flexible elements having the form of fins.

* * * * *